United States Patent
Takaoka et al.

(10) Patent No.: US 10,349,415 B2
(45) Date of Patent: *Jul. 9, 2019

(54) POWER HEADROOM CALCULATION APPARATUS AND A POWER HEADROOM CALCULATION METHOD

(71) Applicant: Sun Patent Trust, New York, NY (US)

(72) Inventors: Shinsuke Takaoka, Osaka (JP); Takashi Iwai, Ishikawa (JP)

(73) Assignee: SUN PATENT TRUST, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/372,563

(22) Filed: Dec. 8, 2016

(65) Prior Publication Data

US 2017/0086200 A1    Mar. 23, 2017

Related U.S. Application Data

(63) Continuation of application No. 14/699,374, filed on Apr. 29, 2015, now Pat. No. 9,554,387, which is a
(Continued)

(30) Foreign Application Priority Data

Aug. 9, 2010    (JP) .................. 2010-178671

(51) Int. Cl.
   *H04W 72/04*    (2009.01)
   *H04W 52/36*    (2009.01)
   (Continued)

(52) U.S. Cl.
   CPC ......... *H04W 72/0473* (2013.01); *H04L 5/001* (2013.01); *H04L 5/0053* (2013.01);
   (Continued)

(58) Field of Classification Search
   CPC ..... H04L 1/0031; H04L 1/1607; H04L 5/001; H04L 5/0053; H04L 5/0094;
   (Continued)

(56) References Cited

U.S. PATENT DOCUMENTS 8,249,091 B2 * 8/2012 Kim .................... H04W 52/367
                                              370/329
2010/0041428 A1    2/2010 Chen et al.
(Continued)

FOREIGN PATENT DOCUMENTS

| CN | 101715207 A | 5/2010 |
|---|---|---|
| WO | 2010/008859 A1 | 1/2010 |
| WO | 2010/065759 A2 | 6/2010 |

OTHER PUBLICATIONS

English translation of the Search Report for Chinese Application No. 201180037569.X dated Dec. 23, 2014.
(Continued)

*Primary Examiner* — Andrew Lai
*Assistant Examiner* — M Mostazir Rahman
(74) *Attorney, Agent, or Firm* — Pearne & Gordon LLP

(57) ABSTRACT

Provided is an integrated circuit that calculates a power headroom (PHR) and that can preclude the recognition mismatch in which the reference formats of different UL grants are recognized between a wireless communication terminal apparatus and a wireless communication base station apparatus. For the PHR calculation of a PUSCH in a CC in which no UL grant is present, a UL grant, which was used for calculating the PHR in another CC having the same subframe number as the PUSCH, is used. For example, as to a subframe number=#1, the UL grant of CC #0 is used for calculating the PHR of CC #2 in which no UL grant is present.

10 Claims, 14 Drawing Sheets

Related U.S. Application Data continuation of application No. 13/814,787, filed as application No. PCT/JP2011/003980 on Jul. 12, 2011, now Pat. No. 9,113,472.

(51) Int. Cl.

| | |
|---|---|
| *H04W 52/26* | (2009.01) |
| *H04W 52/24* | (2009.01) |
| *H04L 5/00* | (2006.01) |
| *H04W 52/16* | (2009.01) |
| *H04W 52/14* | (2009.01) |
| *H04W 52/34* | (2009.01) |
| *H04L 1/00* | (2006.01) |
| *H04L 1/16* | (2006.01) |

(52) U.S. Cl.
CPC ......... *H04L 5/0094* (2013.01); *H04W 52/146* (2013.01); *H04W 52/16* (2013.01); *H04W 52/242* (2013.01); *H04W 52/262* (2013.01); *H04W 52/365* (2013.01); *H04W 52/367* (2013.01); *H04W 72/042* (2013.01); *H04L 1/0031* (2013.01); *H04L 1/1607* (2013.01); *H04W 52/34* (2013.01)

(58) Field of Classification Search
CPC . H04W 52/146; H04W 52/16; H04W 52/242; H04W 52/262; H04W 52/34; H04W 52/365; H04W 52/367; H04W 72/042; H04W 72/0473
See application file for complete search history.

(56) References Cited

U.S. PATENT DOCUMENTS

| | | | | |
|---|---|---|---|---|
| 2010/0113004 | A1* | 5/2010 | Cave | H04W 52/365 |
| | | | | 455/422.1 |
| 2010/0150085 | A1* | 6/2010 | Ishii | H04L 1/00 |
| | | | | 370/329 |
| 2010/0272009 | A1* | 10/2010 | Cheng | H04W 52/346 |
| | | | | 370/315 |
| 2011/0090825 | A1* | 4/2011 | Papasakellariou | H04L 1/06 |
| | | | | 370/280 |
| 2011/0159911 | A1* | 6/2011 | Chen | H04W 52/221 |
| | | | | 455/522 |
| 2011/0207467 | A1* | 8/2011 | Hanaki | H04W 72/0486 |
| | | | | 455/450 |
| 2011/0268032 | A1* | 11/2011 | Kim | H04L 1/1671 |
| | | | | 370/328 |
| 2012/0040709 | A1* | 2/2012 | Song | H04W 52/262 |
| | | | | 455/522 |

OTHER PUBLICATIONS

International Search Report for PCT/JP2011/003980 dated Oct. 18, 2011.

Ericsson, ST Ericsson, "Details of PHR Handling for CA", 3GPP TSG-RAN WG2 #70bis Tdoc R2-103570, Jun. 28, 2010.

ZTE, "Discussion on CC specification PHR reporting", 3GPP TSG RAN WG2 #70bis R2-103724, Jun. 28, 2010.

3GPP TSG-RAN WG2 Meeting #70bis, Jun. 28-Jul. 3, 2010, Stockholm, Sweden, Panasonic, Details of cross-carrier power headroom reports, agenda item 7.1.1.6 (R2-103600).

\* cited by examiner

POWER HEADROOM CALCULATION APPARATUS AND A POWER HEADROOM CALCULATION METHOD

CROSS-REFERENCE TO RELATED APPLICATIONS

This application is a continuation of U.S. patent application Ser. No. 14/699,374 filed Apr. 29, 2015, which is a continuation of U.S. patent application Ser. No. 13/814,787 filed Feb. 7, 2013, each of which is hereby incorporated herein by reference in its entirety.

TECHNICAL FIELD

The present invention relates to a radio communication terminal apparatus and a radio communication method for reporting a PHR (power headroom).

BACKGROUND ART

In 3GPP (3rd Generation Partnership Project), studies are being carried out on LTE-advanced. In LTE-advanced, the introduction of a band extension technique called "carrier aggregation" is under study.

In carrier aggregation, a plurality of component carriers (CCs), one CC being composed of 20 MHz, are bundled to aggregate a plurality of carriers and an approach for realizing high-speed transmission is adopted for downlink (DL) and uplink (UL) channels. In LTE-advanced, studies are being carried out with the introduction of five CCs, that is, band extension of up to 100 MHz in view.

In line with this trend, a transmission power control method targeting UL carrier aggregation is also being studied at the same time. In the design of UL transmission power control, a plurality of matters as shown below need to be considered.

First, a limit value is placed on transmission power of a terminal and values satisfying legal standards (e.g., maximum transmission power value) are set in each country.

Second, transmission power control of a UL channel (PUSCH: Physical Uplink Shared CHannel) of 3GPP LTE Re1.8 is a control method using both closed-loop control and open-loop control, and therefore a pathloss value used for setting UL transmission power is calculated through estimation from a reference signal received by a terminal on a DL. Therefore, a base station generally does not know an accurate pathloss value used for setting UL transmission power.

Third, a value dependent on the implementation of the terminal which is unknown to the base station (e.g., maximum power reduction (MPR) which is a value dependent on the implementation of RF of the terminal) also has an influence on the actual transmission power value of the terminal.

In consideration of such matters, in order for the base station to perform flexible scheduling in UL transmission, time-frequency resource allocation and link adaptation (adaptive modulation, channel coding, closed-loop transmission power control or the like), the base station needs information to know actual transmission power of the terminal.

Thus, conventionally (3GPP LTE Re1.8), the terminal reports, to the base station, information on a transmission power headroom called "PHR" at the terminal using a UL channel (to be more specific, PUSCH or the like). A PHR of 3GPP LTE Re1.8 (following equation 2) is defined by a difference between maximum transmission power of the terminal and a transmission power value of a PUSCH (following equation 1).

[1]
$$P_{PUSCH}(i) = \min\{P_{cmax}, 10\log_{10}(M_{PUSCH}(i)) + P_{o\_PUSCH}(j) + \alpha(j)PL + \Delta_{TF}(j) + f(i)\}$$ (Equation 1)

[2]
$$PH(i) = P_{cmax} - \{10\log_{10}(M_{PUSCH}(i)) + P_{o\_PUSCH}(j) + \alpha(j)PL + \Delta_{TF}(j) + f(i)\}$$ (Equation 2)

In equations 1 and 2, $P_{cmax}$ P denotes maximum transmission power for each CC, $M_{PUSCH}(i)$ denotes an allocation bandwidth of a PUSCH, $P_{o\_PUSCH}(j)$ and $\alpha(j)$ denote parameters reported from the base station using a higher layer, PL denotes a pathloss estimate value estimated by the terminal, $\Delta TF(j)$ denotes an offset value related to a Modulation and channel Coding Set (MCS), and $f(i)$ denotes an accumulated value of a Transmit Power Control (TPC) command.

The terminal reports the PHR to the base station and the base station appropriately performs link adaptation and time-frequency scheduling using the PHR reported from each terminal.

In 3GPP LTE Re1.8, since such PHR reporting targets only one CC of 20 MHz, studies are being carried out on a method of reporting a PHR targeting carrier aggregation made up of a plurality of CCs of the UL. The following are terms of agreement relating to PHR reporting of UL carrier aggregation to date in 3 GPP.

As a method of reporting a PHR of UL carrier aggregation, it is agreed that a PHR is reported for each CC and the following two types are defined as PHR for each CC.

Type 1: Pcmax-PUSCH transmission power (P_cmax minus PUSCH power)

Type 2: Pcmax-PUCCH transmission power-PUSCH transmission power (P_cmax minus PUCCH power minus PUSCH power)

When there is no Physical Uplink Control CHannel (PUCCH) transmission, Format 1A is used as a reference format to calculate a PHR. On the other hand, when there is PUCCH transmission, the actual format reported from the base station to the terminal is used to calculate transmission power and a PHR.

Here, Pcmax denotes maximum transmission power for each CC of the terminal. Type 1 mainly targets CCs which will not simultaneously transmit PUCCH and PUSCH, and is defined with a difference value between maximum transmission power for each CC and PUSCH transmission power as in the case of the definition of 3GPP LTE Re1.8.

On the other hand, type 2 mainly targets CCs which may simultaneously transmit PUCCH and PUSCH, and is defined with a value resulting from subtracting a total value of transmission power of PUCCH and PUSCH from maximum transmission power for each CC.

However, two cases are anticipated; a case where there is simultaneous transmission of PUCCH and PUSCH in a CC and a case where there is no simultaneous transmission. For this reason, when there is no PUCCH transmission, Format 1A used for transmission of ACK (Acknowledgment) or NACK (Non-acknowledgment) or the like is used as a reference format to calculate PUCCH transmission power. When there is PUCCH transmission, the actual format reported from the base station is used to calculate PUCCH transmission power. In equation 1 and equation 2, examples of information related to a UL grant (transmission format) reported through a DL control channel of a physical layer (PDCCH: Physical Downlink Control CHannel) include PUSCH allocation bandwidth information ($M_{PUSCH}(i)$), MCS-related offset value ($\Delta TF(j)$) and accumulated value ($f(i)$) of TPC command.

Furthermore, as the method for reporting PHRs of a plurality of CCs, it is agreed that when PHR reporting is triggered, PHRs of all CCs configured (Per CC PHR) are fed back to the base station through an UL channel (an approach for selecting a PHR to be fed back is also considered). However, when there is no UL grant (transmission format; UL transmission bandwidth, MCS information or the like) to be reported from the base station to the terminal for all PUSCHs of a plurality of CCs (or a plurality of PUSCHs of CCs for reporting a PHR), it is not possible to calculate transmission power and PHR of a PUSCH with no UL grant (see FIG. 1).

In FIG. 1, at PHR report timing, a per CC PUSCH enclosed by a dotted line denotes a PUSCH with no UL grant (no transmission), a shaded area denotes a PUSCH with a UL grant (with transmission) and a diagonally shaded area denotes a PUCCH. Therefore, the per CC PUSCH enclosed by a dotted line corresponds to a PUSCH using a reference format to calculate the corresponding per CC PHR and the PUSCH of the shaded area corresponds to a PUSCH using a UL grant to calculate the corresponding per CC PHR. Based on 3GPP LTE Rel.8, the PUSCH transmission power and PHR are calculated according to equations 1 and 2. Information such as bandwidth information $M_{PUSCH}(i)$ and $\Delta TF(j)$ of equation 1 and equation 2 is calculated based on a (reference) format of a UL grant.

Thus, in reporting of a plurality of per CC PHRs, the definition of a reference format for a PUSCH with no UL grant (no transmission) is currently under study, which is described in NPL 1. As shown in FIG. 2, NPL 1 describes an approach of calculating transmission power and PHR of a current Transmission Time Interval (TTI) using a UL grant in a past TTI reported from a base station to a terminal as a reference format of transmission power of a PUSCH of the current TTI.

CITATION LIST

Non-Patent Literature

NPL 1
R2-103724, Discussion on CC specific PHR reporting, 3GPP TSG RAN WG2 #70bis, Stockholm, Sweden, 28 Jun.-2 Jul. 2010

SUMMARY OF INVENTION

Technical Problem

However, the technique disclosed in above NPL 1 involves the following problems.

When a terminal cannot correctly receive past PDCCHs including a UL grant for a plurality of CCs, if, for example, the terminal fails to receive PDCCHs including a UL grant for the corresponding CCs, a base station cannot recognize that the terminal has failed for a certain time. For this reason, a recognition mismatch between the terminal and the base station is produced about a reference format of a UL grant used to calculate a PHR.

To be more specific, referring to the example shown in FIG. 2, when the terminal fails to receive a PDCCH including a UL grant of subframe number=#5 in CC#0, the terminal uses a UL grant of subframe number=#3 received before to calculate a PHR, but the base station recognizes that the UL grant transmitted in subframe number=#5 is used by the terminal to calculate a PHR.

As a result, the base station misrecognizes the actual transmission power information (PHR which is transmission power headroom information) of the terminal in the CC in which the recognition mismatch has occurred and the base station performs scheduling, link adaptation or resource allocation for each CC or between CCs, based on wrong PHR information.

It is an object of the present invention to provide a radio communication terminal apparatus and a radio communication method for preventing such a recognition mismatch that a radio communication base station apparatus and the terminal recognize reference formats of different UL grants.

Solution to Problem

A radio communication terminal apparatus according to the present invention is a radio communication terminal apparatus that transmits a transmission power headroom for each component carrier on an uplink, and adopts a configuration including: a transmission power headroom calculation section that uses parameter information used to calculate a transmission power headroom of an uplink channel to calculate transmission power or a transmission power headroom of another uplink channel that is not transmitting any uplink allocation signal for each component carrier; and a transmitting section that transmits the calculated transmission power or transmission power headroom of the other uplink channel.

A radio communication method according to the present invention is a radio communication method for transmitting a transmission power headroom of a radio communication terminal apparatus for each component carrier on an uplink, the method including: using parameter information used to calculate a transmission power headroom of an uplink channel to calculate transmission power or a transmission power headroom of another uplink channel that is not transmitting any uplink allocation signal for each component carrier; and transmitting the calculated transmission power or transmission power headroom of the other uplink channel.

Advantageous Effects of Invention

According to the present invention, it is possible to prevent such a recognition mismatch that a radio communication terminal apparatus and a radio communication base station apparatus recognize reference formats of different UL grants.

DESCRIPTION OF EMBODIMENTS

Hereinafter, embodiments of the present invention will be described in detail with reference to the accompanying drawings.

Embodiment 1

Figure 1:
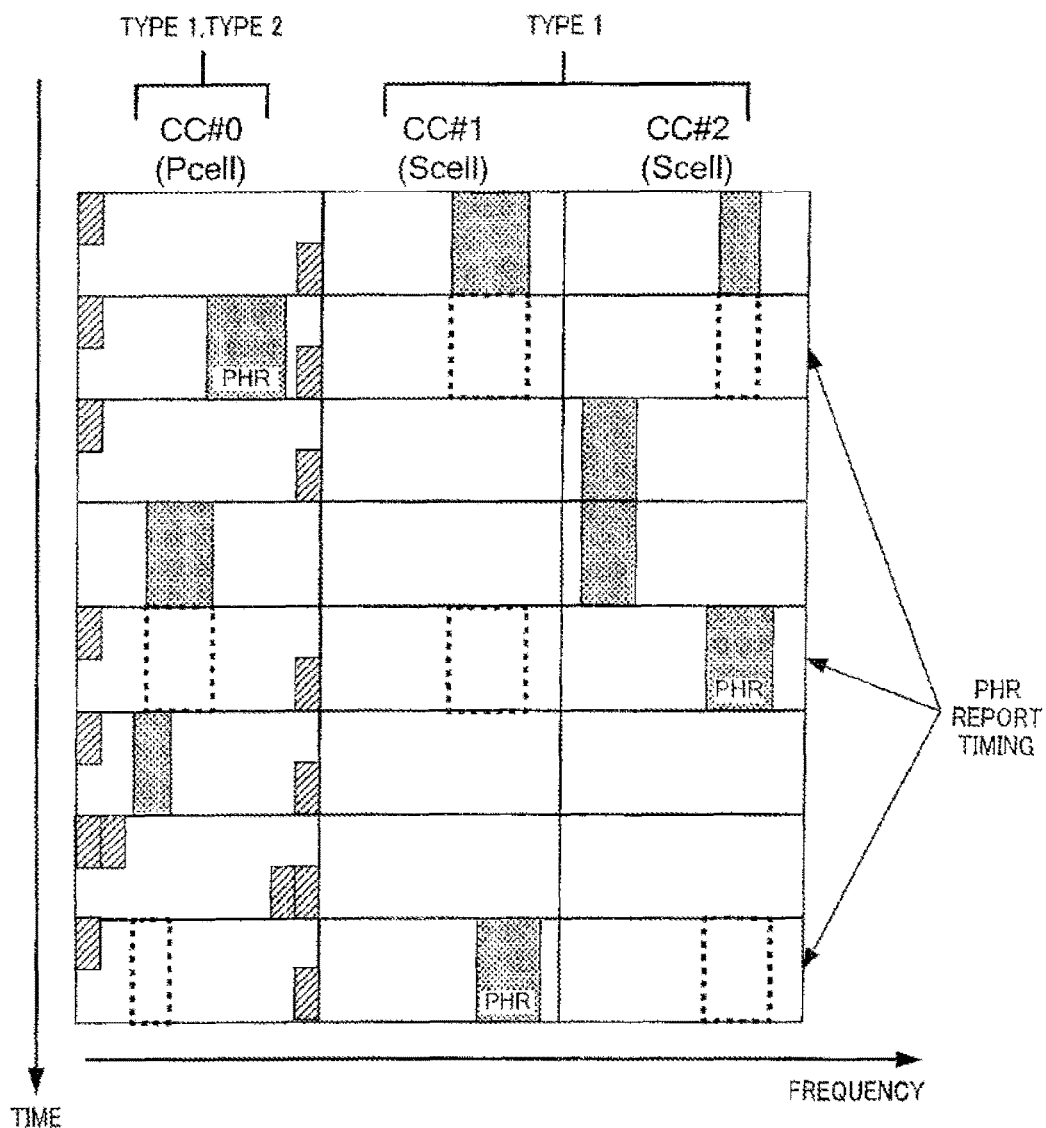
FIG. 1 is a diagram illustrating PUSCH and PUCCH resources allocated in a plurality of CCs.
Figure 2:
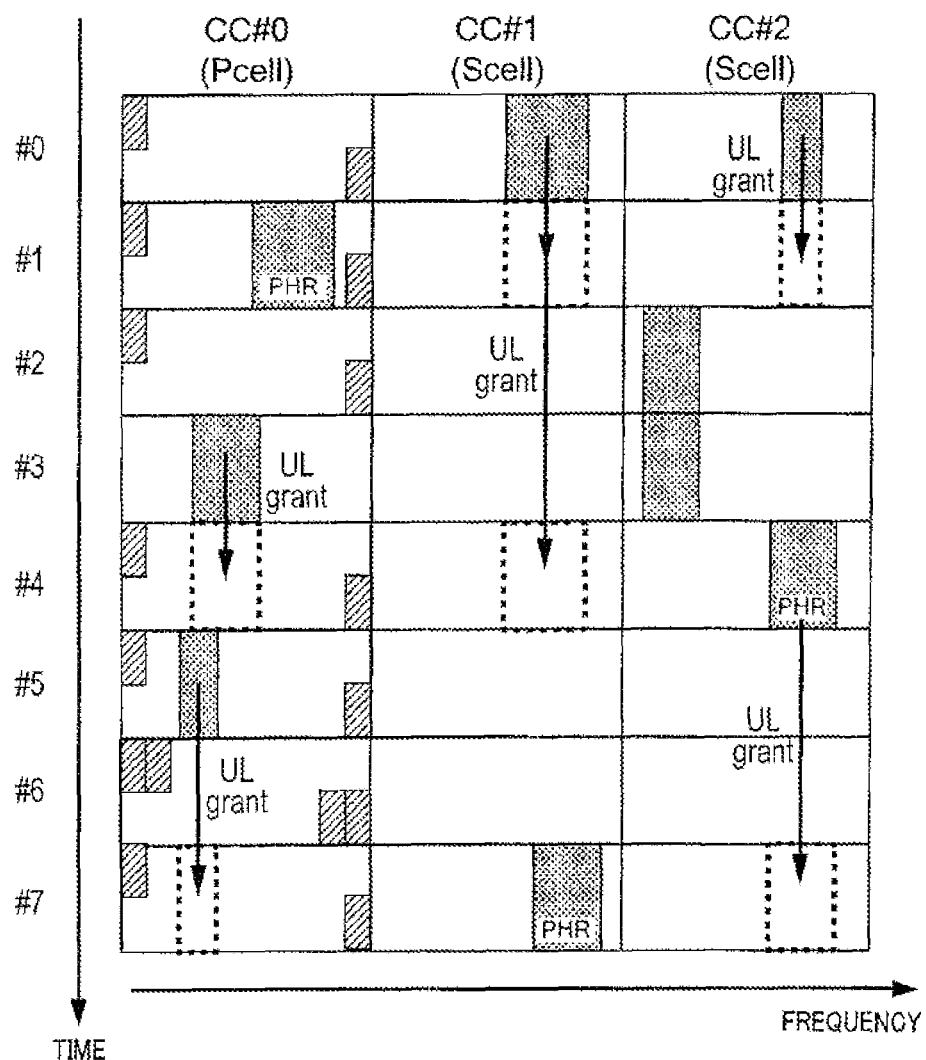
FIG. 2 is a conceptual diagram illustrating a past UL grant being used as a reference format of transmission power of a current PUSCH described in NPL 1.
Figure 3:
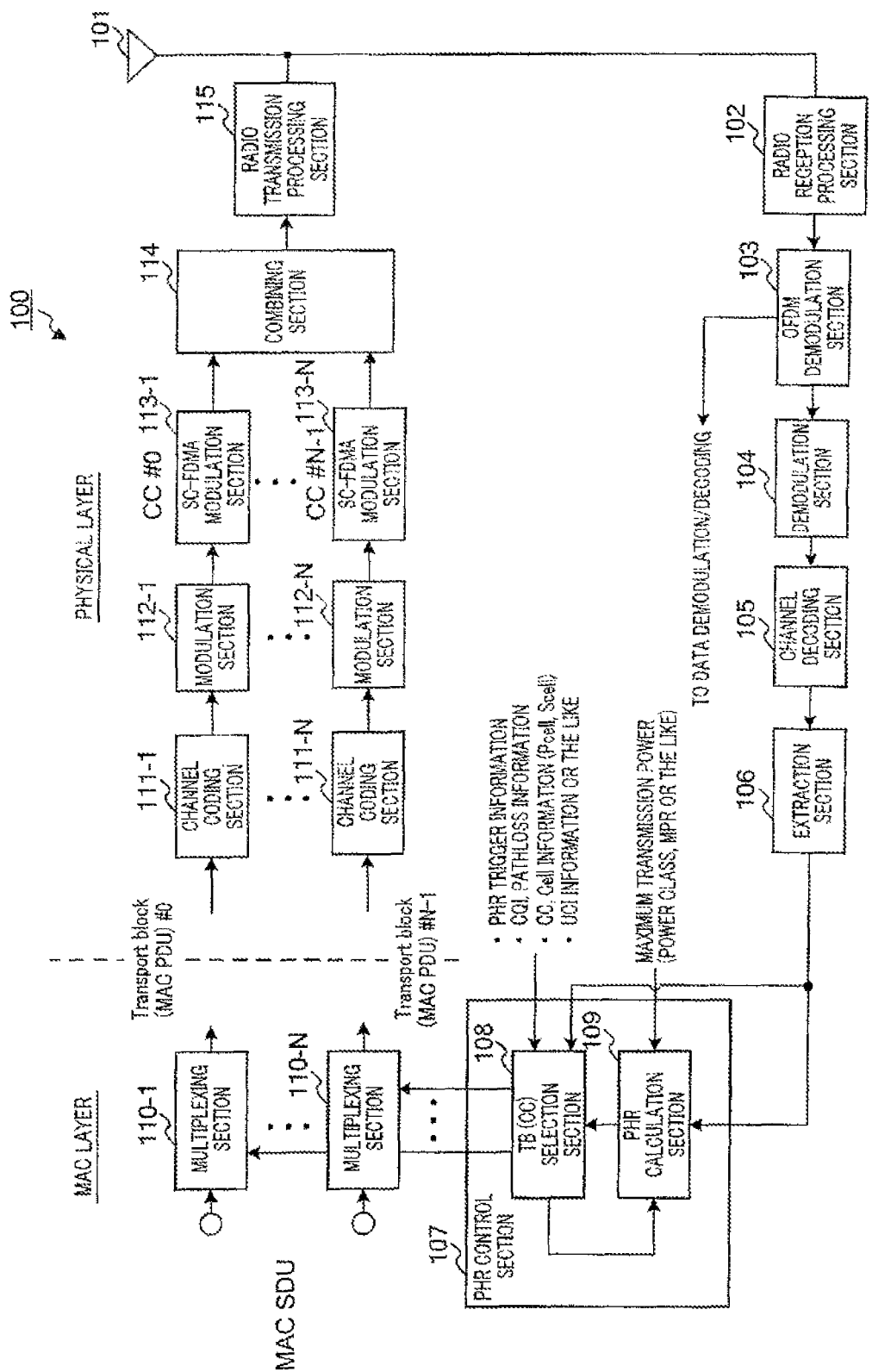
FIG. 3 is a block diagram illustrating a configuration of a radio communication terminal apparatus according to Embodiment 1 of the present invention.

FIG. 3 is a block diagram illustrating a configuration of radio communication terminal apparatus (hereinafter, simply referred to as "terminal") 100 according to Embodiment 1 of the present invention. Hereinafter, the configuration of terminal 100 will be described with reference to FIG. 3.

Radio reception processing section 102 receives an OFDM signal transmitted from a base station via antenna 101, applies predetermined radio reception processing such as down-conversion, A/D conversion to the received OFDM signal and outputs the received OFDM signal to OFDM demodulation section 103.

OFDM demodulation section 103 removes a guard interval from the received OFDM signal outputted from radio reception processing section 102, applies discrete Fourier transform (DFT) to transform the OFDM signal into a frequency-domain signal. OFDM demodulation section 103 applies frequency-domain equalization (FDE) to each frequency-domain component, removes signal distortion, outputs a data signal to a data demodulation/decoding section (not shown) and outputs a control signal (e.g., a PDCCH including a UL grant) to demodulation section 104.

Demodulation section 104 applies predetermined demodulation processing corresponding to a modulation scheme such as QPSK or 16QAM to the control signal outputted from OFDM demodulation section 103 and outputs the demodulated control signal to channel decoding section 105.

Channel decoding section 105 applies, to the control signal outputted from demodulation section 104, decoding processing (iterative MAP decoding, Viterbi decoding) corresponding to error correcting coding such as turbo coding, convolutional coding applied in the base station, and outputs the decoded control signal to extraction section 106.

Extraction section 106 extracts information such as a UL grant (allocation bandwidth, MCS set, TPC command or the like) which is an uplink allocation signal, Uplink Control Information (UCI) information (ACK/NACK, Rank Indicator (RI), Channel Quality Indicator (CQI), Channel State Information (CSI), Precoding Matrix Indicator (PMI)) from the control information outputted from channel decoding section 105 and outputs the extracted information to TB (CC) selection section 108 and PHR calculation section 109 of PHR control section 107.

PHR control section 107 is provided with TB (CC) selection section 108 and PHR calculation section 109, and TB (CC) selection section 108 selects a Transport Block (TB) with which a PHR is multiplexed, based on the inputted information such as PHR trigger information for each CC (or common to a plurality of CCs or common to all CCs), CQI for each CC, pathloss information for each CC, CC cell information (Pcell: Primary cell (PCC: Primary component carrier), Scell: Secondary Cell (SCC: Secondary component carrier)), UL grant, UCI ACK/NACK, RI, CQI, CSI, PMI, frequency for each CC (information on the level of a CC carrier frequency) (examples where a PHR is triggered include a timer-based method and a pathloss-based method or the like). A TB is identified by a CC and a codeword. For example, TB (CC) selection section 108 selects a TB transmitted with a CC of the highest quality (high receiving quality (SINR) at the base station) as the TB with which a PHR, which is important control information, is multiplexed, based on pathloss information (or inputted frequency for each CC) or the like. TB (CC) selection section 108 then identifies a reference format (UL grant) of a CC (PUSCH) with which the selected TB is transmitted. Examples of reference format information include bandwidth information, MCS information, pathloss information, TPC command information, parameter information reported in a higher layer as described above (equation 1 or equation 2). TB (CC) selection section 108 outputs TB (CC, codeword) information with which a PHR is multiplexed, a reference format (UL grant) of its CC, TB and codeword to PHR calculation section 109.

PHR calculation section 109 calculates a per CC PHR based on inputted maximum transmission power information (power class, MPR or the like) for each CC, a UL grant with PUSCH allocation, UCI information and information inputted from TB (CC) selection section 108. For a CC (PUSCH) with no UL grant, PHR calculation section 109 calculates PUSCH transmission power first using equation 1 or the like based on the reference format (UL grant) outputted from TB (CC) selection section 108 (when there is PUCCH transmission in the same CC, PUCCH transmission power is also calculated). PHR calculation section 109 calculates a per CC PHR by subtracting PUSCH transmission power (and PUCCH transmission power) from maximum transmission power for each CC. For a CC (PUSCH) with a UL grant, PHR calculation section 109 calculates transmission power and a per CC PHR based on a UL grant for the corresponding PUSCH. The calculated per CC PHR is outputted to TB (CC) selection section 108.

As described above, TB (CC) selection section 108 outputs per CC PHRs to multiplexing sections 110-1 to 110-N corresponding to respective TBs so that the per CC PHRs inputted are multiplexed with a TB (CC, codeword and MAC PDU) with which a plurality of per CC PHRs selected beforehand are multiplexed. All of the plurality of per CC PHRs inputted may be multiplexed with one TB or may be divided and multiplexed with a plurality of TBs.

Multiplexing sections 110-1 to 110-N multiplex per CC PHRs with a MAC SDU (RLC (Radio Link Control) PDU) inputted and output the multiplexed PHRs to channel coding sections 111-1 to 111-N.

Figure 4A:
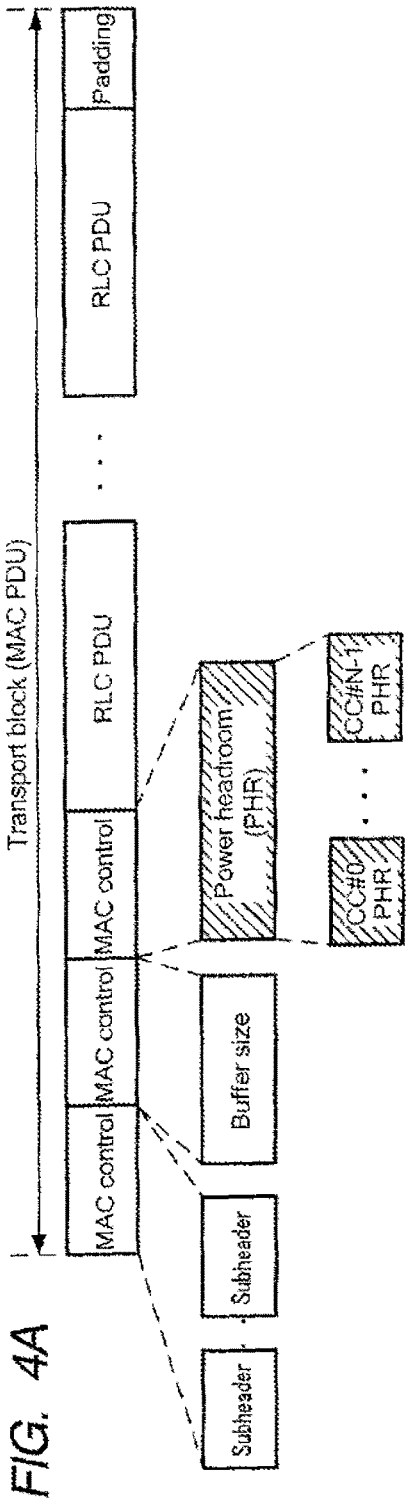
FIGS. 4A and 4B are diagrams illustrating an example of format configuration after multiplexing.
Figure 4B:
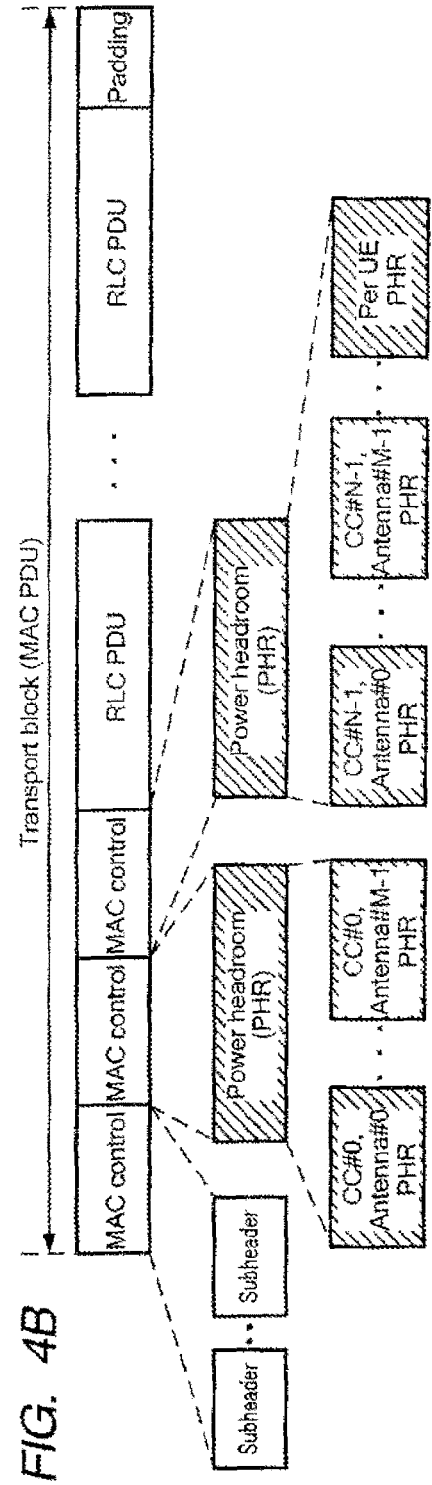

FIGS. 4A and 4B show an example of a format configuration after the multiplexing. FIG. 4A shows an example where N CC PHRs are multiplexed with the third MAC control. A configuration may also be adopted in which per CC PHRs are multiplexed with a plurality of MAC controls. For example, as shown in FIG. 4B, when a plurality of per CC PHRs corresponding to per CC (layer, codeword) antennas are multiplexed, per antenna PHRs may be grouped by CC and multiplexed into one MAC control unit. That is, this is a configuration in which a plurality of per CC and per antenna (layer, codeword) PHRs are reported using a plurality of MAC controls in one transport block (TB). Furthermore, in addition to the above-described PHRs, a configuration may also be adopted in which a PHR of the entire terminal is multiplexed at the same time. The entire terminal PHR (Per UE PHR) is generally defined by a value obtained by subtracting a total transmission power value of all CCs (channels) from maximum transmission power of the entire terminal. Multiplexing sections 110-1 to 110-N output PHRs multiplexed with a TB (MAC PDU) to channel coding sections 111-1 to 111-N of a physical layer.

A plurality of processing sections, control sections or the like exist between multiplexing sections 110-1 to 110-N of the MAC layer and channel coding sections 111-1 to 111-N of the physical layer, but these sections are omitted here for simplicity.

Channel coding sections 111-1 to 111-N apply error correcting coding such as turbo coding to TBs outputted from multiplexing sections 110-1 to 110-N and output the coded TBs to modulation sections 112-1 to 112-N.

Modulation sections 112-1 to 112-N apply predetermined modulation processing of QPSK, 16QAM or the like to the signals outputted from channel coding sections 111-1 to 111-N and output the modulated signals to SC-FDMA modulation sections 113-1 to 113-N.

SC-FDMA modulation sections 113-1 to 113-N apply DFT to symbol sequences outputted from modulation sections 112-1 to 112-N to thereby perform precoding. SC-FDMA modulation sections 113-1 to 113-N then map the DFT precoded signals to predetermined frequency resources indicated from the base station, apply Inverse Discrete Fourier Transform (IDFT) to transform the signals into a time-domain signal (SC-FDMA signal). Furthermore, SC-FDMA modulation sections 113-1 to 113-N add a guard interval to the SC-FDMA signal and outputs the SC-FDMA signal to combining section 114.

Combining section 114 combines the per CC SC-FDMA signals outputted from SC-FDMA modulation sections 113-1 to 113-N and outputs the combined signal to radio transmission processing section 115.

Radio transmission processing section 115 applies predetermined radio transmission processing such as D/A conversion, amplification processing, up-conversion to the SC-FDMA signal outputted from combining section 114 and transmits the SC-FDMA signal via antenna 101.

Figure 5:
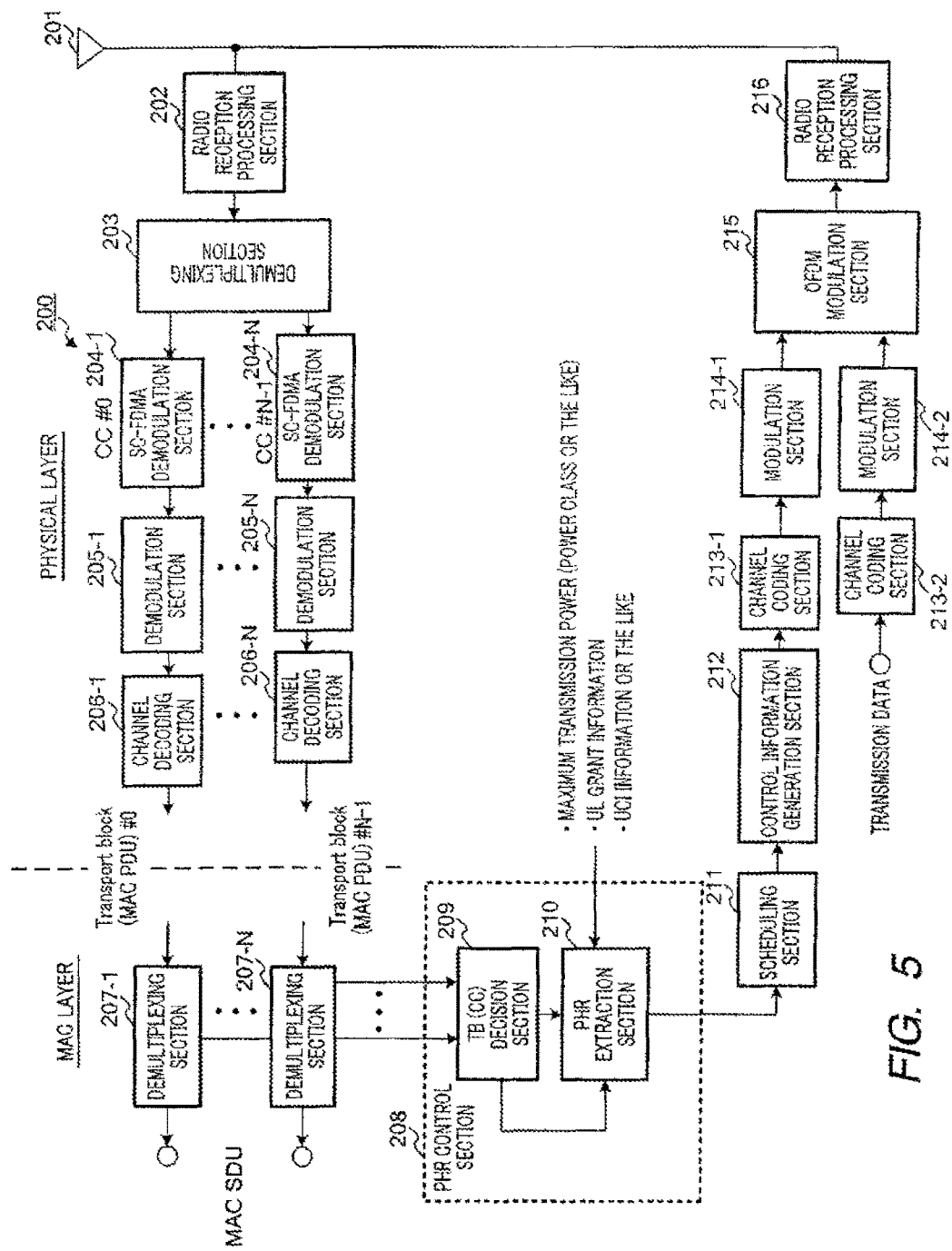
FIG. 5 is a block diagram illustrating a configuration of a radio communication base station apparatus according to Embodiment 1 of the present invention.

FIG. 5 is a block diagram illustrating a configuration of radio communication base station apparatus (hereinafter, simply referred to as "base station") 200 according to Embodiment 1 of the present invention. The configuration of base station 200 will be described below using FIG. 5.

Radio reception processing section 202 receives the SC-FDMA signal transmitted from the terminal via antenna 201, applies predetermined radio reception processing such as down-conversion, A/D conversion and outputs the SC-FDMA signal to demultiplexing section 203.

Demultiplexing section 203 demultiplexes the SC-FDMA signal outputted from radio reception processing section 202 for each CC and outputs the demultiplexed SC-FDMA signals to per CC SC-FDMA demodulation sections 204-1 to 204-N.

SC-FDMA demodulation sections 204-1 to 204-N remove guard intervals from the SC-FDMA signals outputted from demultiplexing section 203, and apply DFT to transform the SC-FDMA signals into frequency-domain signals. Next, SC-FDMA demodulation sections 204-1 to 204-N apply frequency-domain equalization to each frequency-domain component to remove signal distortion, apply IDFT to transform the components into time-domain signals and output the time-domain signals to demodulation sections 205-1 to 205-N.

Demodulation sections 205-1 to 205-N apply predetermined demodulation processing corresponding to modulation schemes such as QPSK and 16QAM to the signals outputted from SC-FDMA demodulation sections 204-1 to 204-N and output the demodulated signals to channel decoding sections 206-1 to 206-N.

Channel decoding sections 206-1 to 206-N apply decoding processing (iterative MAP decoding, Viterbi decoding) corresponding to the error correcting coding such as turbo coding and convolutional coding applied in the terminal to the signals outputted from demodulation sections 205-1 to 205-N, and output the decoded signals to demultiplexing sections 207-1 to 207-N.

A plurality of processing sections and control sections or the like exist between demultiplexing sections 207-1 to 207-N in the MAC layer and channel decoding sections 206-1 to 206-N in the physical layer, but description of these sections will be omitted here for simplicity.

Demultiplexing sections 207-1 to 207-N demultiplex MAC controls including PHR information multiplexed with TBs (MAC PDUs) outputted from channel decoding sections 206-1 to 206-N and output the demultiplexed MAC controls to TB (CC) decision section 209 of PHR control section 208. Furthermore, demultiplexing sections 207-1 to 207-N output MAC SDUs to a control section (not shown) or the like.

TB (CC) decision section 209 detects a TB (CC, codeword) with which PHR information (for each CC, for each antenna, for the entire terminal (Per UE)) is multiplexed from among MAC controls of the plurality of TBs outputted from demultiplexing sections 207-1 to 207-N. TB (CC) decision section 209 outputs the detected TB (CC, codeword) with which the PHR is multiplexed and a reference format (UL grant) of the TB (CC, codeword) reported by the base station to the terminal beforehand, to PHR extraction section 210.

PHR extraction section 210 extracts the PHR information from the TB (CC, codeword) with which the PHR is multiplexed outputted from TB (CC) decision section 209. PHR extraction section 209 detects (or estimates) transmission power headroom information of the corresponding CC of the terminal, pathloss information and TPC command error information from the reference format (UL grant) of the TB (CC, codeword) used to calculate the PHR, maximum transmission power information and the extracted per CC PHR, and outputs the information to scheduling section 211.

Scheduling section 211 determines parameters for scheduling and link adaptation based on information such as per CC transmission power headroom information, pathloss information, TPC command error information, CQI and interference outputted from PHR extraction section 210, and outputs the determined parameters to control information generation section 212. Here, examples of the determined parameters include a UL grant (allocation bandwidth, MCS set, TPC command or the like), Rank Indicator (RI), Precoding Matrix Indicator (PMI) information.

Control information generation section 212 converts the parameters outputted from scheduling section 211 to binary control information bits and outputs the binary control information bits to channel coding section 213-1.

Channel coding section 213-1 applies error correcting coding such as turbo coding to the control bit information outputted from control information generation section 212 and outputs the coded information to modulation section 214-1.

Modulation section 214-1 applies predetermined modulation processing of QPSK, 16QAM or the like to the signal outputted from channel coding section 213-1 and outputs the modulated signal to OFDM modulation section 215. Channel coding section 213-2 and modulation section 214-2 apply processing similar to that described above to the transmission data signal as well.

OFDM modulation section 215 maps the control signal outputted from modulation section 214-1 and the data signal outputted from modulation section 214-2 to predetermined frequency resources, applies IDFT to transform the mapped signal and data into a time-domain signal (OFDM signal). OFDM modulation section 215 adds a guard interval to the OFDM signal and outputs the OFDM signal to radio transmission processing section 216.

Radio transmission processing section 216 applies predetermined radio transmission processing such as D/A conversion, amplification processing, up-conversion to the OFDM signal outputted from OFDM modulation section 215 and transmits the OFDM signal via antenna 201.

Figure 6:
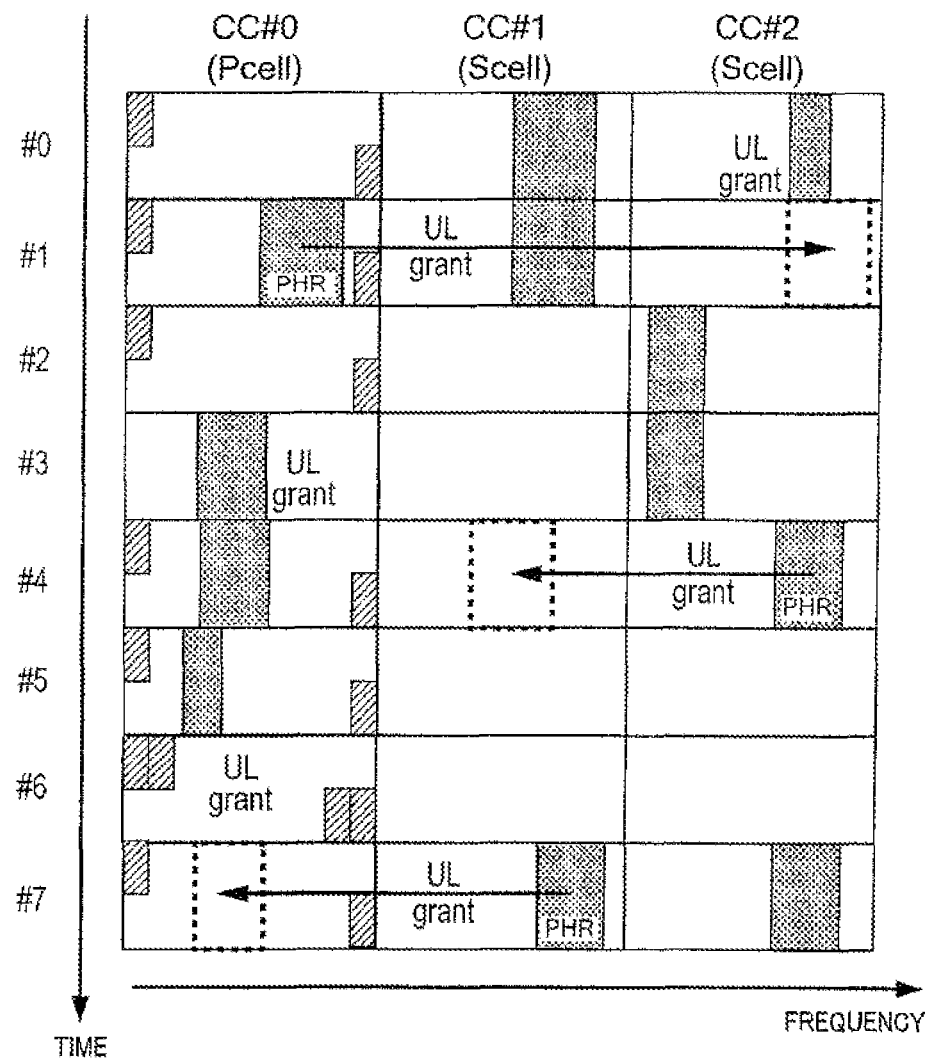
FIG. 6 is a diagram illustrating operation of a PHR calculation section of the terminal shown in FIG. 3.

Next, operation of PHR calculation section 109 of the terminal shown in FIG. 3 will be described using FIG. 6. FIG. 6 assumes a case where carrier aggregation is configured using three CCs, and shows a case where CC#0 is a primary cell (Pcell, primary component band (PCC: Primary Component Carrier)), CC#1 and CC#2 are secondary cells (Scell, secondary component band (SCC: Secondary Component Carrier)). Furthermore, PUSCHs of CCs enclosed by dotted lines represent PUSCHs with no UL grant (no transmission), shaded areas represent PUSCHs with UL grants (with transmission) and diagonally shaded areas represent PUCCHs. Furthermore, PHRs of three CCs are simultaneously fed back at timings indicated by subframe numbers #1, #4 and #7. Furthermore, regarding CCs used for PHR reporting, CC#0 is used in subframe number=#1, CC#2 is used in subframe number=#4 and CC#1 is used in subframe number=#7. That is, a case is shown where a PHR of a certain CC can also be reported using a different CC (the same may also be applicable to a case where a PHR of a certain CC is reported using a PUSCH of the same CC).

As is clear from FIG. 6, a UL grant of a PUSCH of a CC that transmits a PHR is used to calculate a PHR of a PUSCH of a CC with no UL grant. In subframe number=#1, a UL grant of CC#0 is used to calculate a PHR of CC#2 with no UL grant. Furthermore, in subframe number=#4, a UL grant of CC#2 is used to calculate a PHR of CC#1 with no UL grant. Furthermore, in subframe number=#7, a UL grant of CC#1 is used to calculate a PHR of CC#0 with no UL grant.

At respective timings of reporting PHRs, in a PUSCH of a CC with a UL grant, a per CC PHR is calculated based on the information. For example, in subframe number=#1, a PHR of each CC is calculated such that the PHR of CC#0 is calculated using a UL grant of CC#0 and the PHR of CC#1 is calculated using a UL grant of CC#1.

Thus, the present embodiment shares the same UL grant among different CCs (frequencies) to calculate a PHR of a PUSCH in a CC with no UL grant, for example, using a UL grant used to calculate a PHR in another CC at the same transmission timing (subframe number) as that of the PUSCH. This is because the fact that a PHR of a PUSCH with a UL grant has been successfully calculated means nothing but that the UL grant of the PUSCH has been received without fail, and sharing such a UL grant prevents a recognition mismatch, that is, the terminal and the base station recognize different UL grants.

Furthermore, capitalizing on the feature that the terminal can select a CC (PUSCH) with which a PHR is multiplexed from among PUSCHs of a plurality of CCs, the terminal uses the UL grant used to calculate a PHR of a CC (uplink channel) for transmitting a PHR as a reference format to calculate a PHR among different CCs (frequencies). When there are PUSCH UL grants in two or more CCs, the terminal preferentially uses CCs of high quality to transmit a PHR which is important control information, and therefore using a PUSCH of a high quality CC as a reference format, it is possible to notify the base station of PHRs of a plurality of CCs including the PHR calculated using the reference format with a reduced probability that errors may occur on the uplink.

If all CCs fail to receive a UL grant at PHR report timing, only PHRs are not reported to the base station, and this has nothing to do with a recognition mismatch that the terminal and the base station recognize different UL grants.

Furthermore, if the terminal can correctly receive even one of UL grants of a plurality of CCs, that is, if the terminal does not fail to receive all UL grants of the plurality of CCs, the base station can acquire a PHR from the terminal without a delay for a PUSCH with no UL grant in the same way as for a PUSCH with a UL grant.

Thus, according to Embodiment 1, by using the UL grant used to calculate PHRs of other CCs (for transmitting PHRs) at the same transmission timing (subframe number) as that of the PUSCH for calculating a PUSCH PHR in a CC with no UL grant, it is possible to prevent a recognition mismatch that the terminal and the base station recognize different UL grants, and the base station can thereby perform scheduling, link adaptation or resource allocation based on PHRs without any recognition mismatch between the base station and the terminal. Furthermore, the base station need not store past UL grants. Furthermore, by using parameter information used to calculate a transmission power headroom of an uplink channel for transmitting a PHR to calculate transmission power or a transmission power headroom of another uplink channel through which no uplink allocation signal is transmitted for each component carrier, it is possible to increase the probability of accurately reporting, to the base station, a plurality of CC PHRs including the PHR calculated using a reference format.

Figure 7:
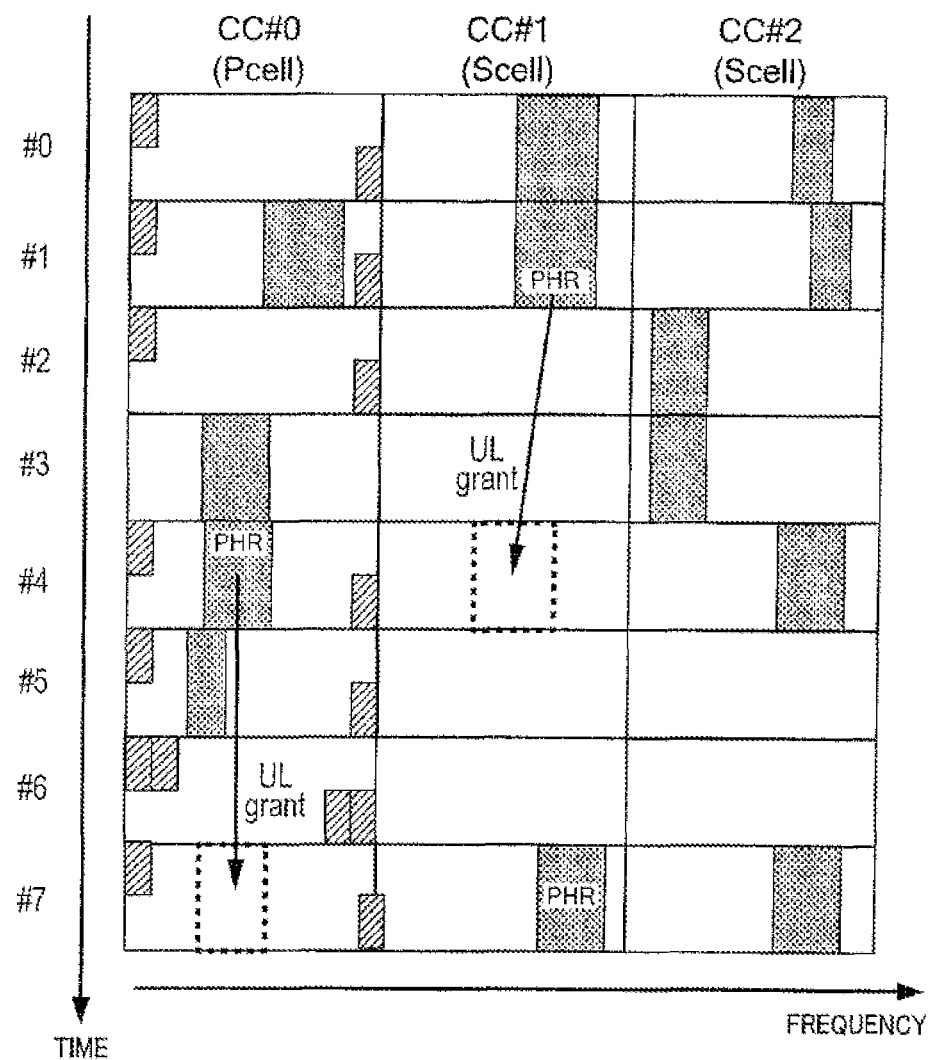
FIG. 7 is a diagram illustrating another operation of the PHR calculation section of the terminal shown in FIG. 3.
Figure 8:
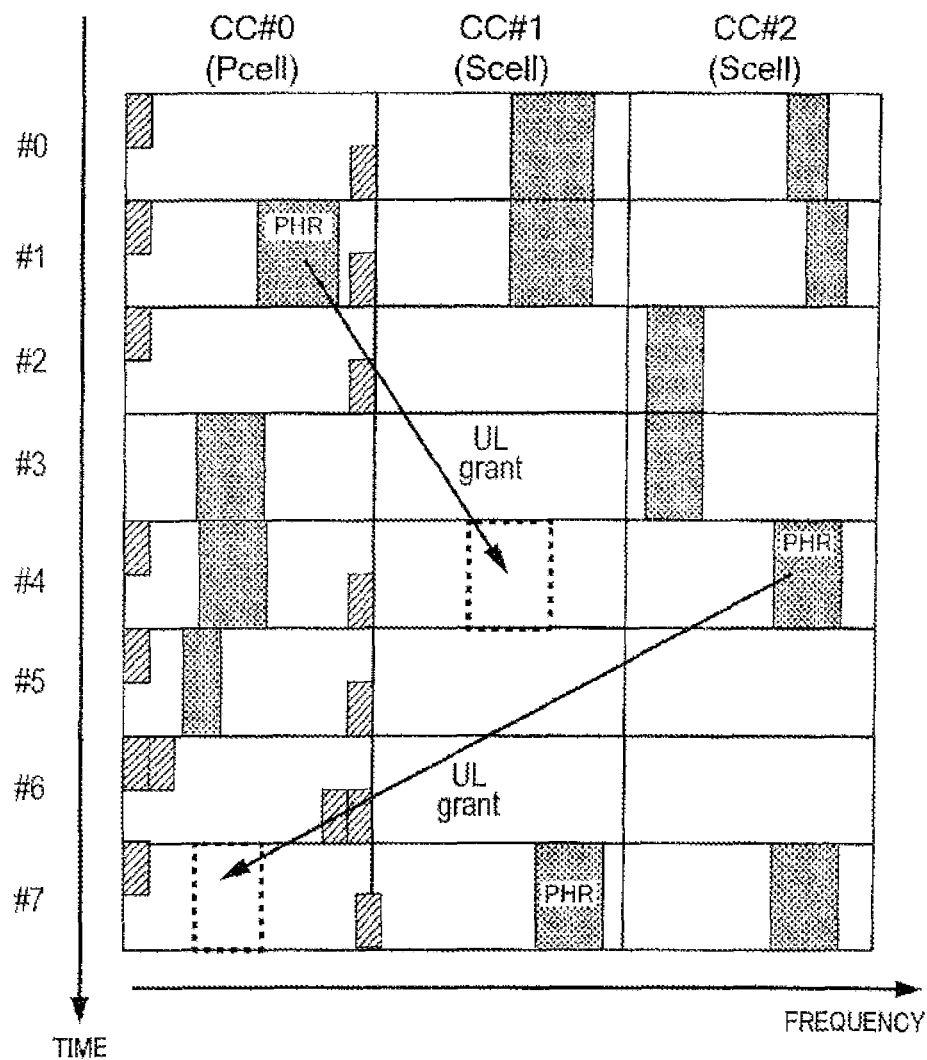
FIG. 8 is a diagram illustrating further operation of the PHR calculation section of the terminal shown in FIG. 3.
Figure 9:
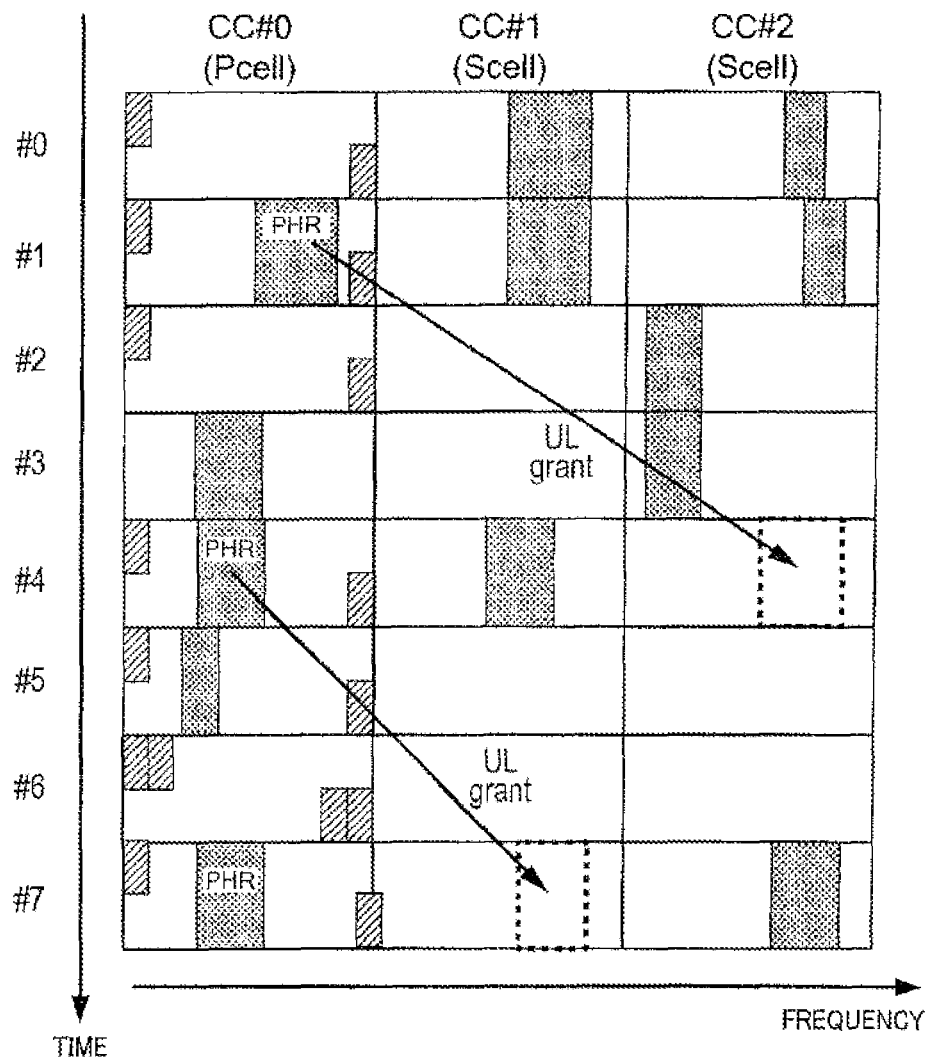
FIG. 9 is a diagram illustrating still further operation of the PHR calculation section of the terminal shown in FIG. 3.

Although a case has been described in the present embodiment where as shown in FIG. 6, the same UL grant is shared among different frequencies (CCs, codewords, TBs), the present invention is not limited to this, but is also applicable to such cases as shown in FIG. 7 to FIG. 9. The following description assumes a case where parameter information used to calculate a transmission power headroom of an uplink channel that transmits a PHR is used to calculate transmission power or a transmission power headroom of another uplink channel that does not transmit a UL grant.

FIG. 7 shows a case where a PHR of a PUSCH in a CC with no UL grant is calculated using a UL grant of a PUSCH used to transmit a (nearest) past PHR in the same CC as the above CC. That is, this is a case where the same UL grant as the UL grant of the PUSCH used to transmit a PHR is shared between different subframes (times). To be more specific, in CC#0, a PHR of subframe number #7 with no UL grant is calculated using a UL grant of a PUSCH used to transmit a PHR of subframe number #4. Furthermore, in CC#1, a PHR of subframe number #4 with no UL grant is calculated using a UL grant of a PUSCH used to transmit a PHR of subframe number #1. This eliminates the necessity for referencing UL grants of different CCs to calculate a CC PHR with no UL grant. That is, it is only necessary to perform PHR calculation control closed in a CC (control over different CCs is unnecessary), and it is thereby possible to simplify the implementation of the terminal and base station in addition to the effects of the above embodiment.

FIG. 8 shows a case where a PUSCH PHR in a CC with no UL grant is calculated using a UL grant of a PUSCH used to transmit a (nearest) past PHR in a CC different from the above CC. That is, this is a case where the same UL grant is shared between different CCs (frequencies) and different subframes (times). To be more specific, a PHR with no UL grant of CC#0 and subframe number #7 is calculated using a UL grant of a PUSCH used to transmit a PHR of CC#2 and subframe number #4. Furthermore, a PHR with no UL grant of CC#1 and subframe number #4 is calculated using a UL grant of a PUSCH used to transmit a PHR of CC#0 and subframe number #1.

In FIG. 8, a UL grant of CC#2 is used to calculate a PHR of CC#0 and a UL grant of CC#0 is used to calculate a PHR of CC#1, but, for example, a UL grant of a neighboring CC may also be preferentially used. For example, a UL grant of CC#1 may be used to calculate a PHR of CC#0 and a UL grant of CC#2 may be used to calculate a PHR of CC#1. That is, a configuration (CC number where a PUSCH of CC#i uses UL grant)=(i+offset value) mod M or (CC number where a PUSCH of CC#i uses UL grant)=(i+offset value) mod M may also be adopted (here, M denotes the number of CCs). This allows the terminal that calculates a PHR to know a UL grant of a CC of the reference destination before the current Transmission Time Interval (TTI), and can thereby suppress an increase the time necessary to calculate the PHR.

FIG. 9 shows a case where a UL grant of a primary cell is preferentially used to calculate a PHR of a PUSCH in a CC with no UL grant. This is for the following reason. Since CCs that can be used by a PUCCH used only to transmit control information without retransmission are limited to primary cells, CCs set for primary cells are more likely to be set in a high quality channel. Therefore, primary cells are more likely to be selected as CCs used to report a PHR which is important control information to be reported using a MAC layer. That is, a shared past UL grant of primary cell is less likely to be old information. For these reasons, the terminal can calculate a PHR based on the latest possible UL grant indicated from the base station, and can thereby report the latest PHR to the base station. Furthermore, the base station needs no longer to store a plurality of past old UL grants.

Figure 10:
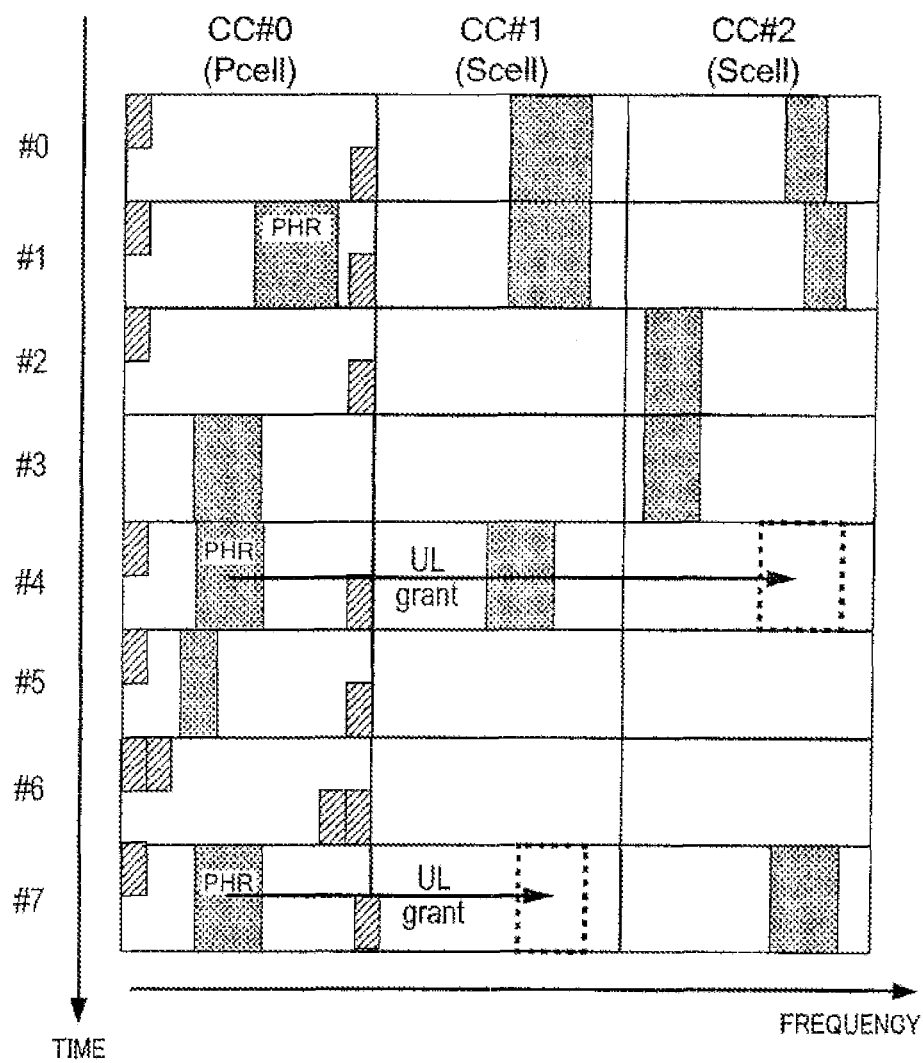
FIG. 10 is a diagram illustrating still further operation of the PHR calculation section of the terminal shown in FIG. 3.

In FIG. 9, a UL grant in CC#0 with the same subframe number may be used for the shared UL grant. For example, as shown in FIG. 10, a UL grant of CC#0 and subframe number #4 may be used as the UL grant used to calculate a PHR of CC#2 and subframe number #4. Furthermore, a UL grant of CC#0 and subframe number #7 may be used as the UL grant used to calculate a PHR of CC#1 and subframe number #7.

In the present embodiment, examples of information of a UL grant referenced to calculate a PHR of a CC with no UL grant include bandwidth, MCS and TPC command. All of these items of information may be used to calculate a PHR, or a PHR may be calculated with reference to at least one of these items of information. When at least one of the items of information is referenced, information not to be referenced may be set to a specific (fixed) value. For example, in equations 1 and 2, a setting may be made so that a transmission power value corresponding to the bandwidth=10 $\log_{10}(M_{PUSCH}(i))$=0 [dB], MCS-related transmission power value=$\Delta TF$=0 [dB], and TPC-command-related transmission power value=f(i)=0 [dB].

Embodiment 2

Embodiment 2 of the present invention will describe a case where Multiple Input Multiple Output (MIMO) transmission is performed using a CC that transmits a PHR. However, the configurations of a terminal and a base station according to Embodiment 2 of the present invention are similar to those shown in FIG. 3 and FIG. 5 of Embodiment 1 and only some functions thereof are different, and therefore the different functions will be described using FIG. 3 and FIG. 5. The following description will be given assuming a case where parameter information used to calculate a transmission power headroom of an uplink channel that transmits a PHR is used to calculate transmission power or a transmission power headroom of another uplink channel that transmits no UL grant.

Figure 11:
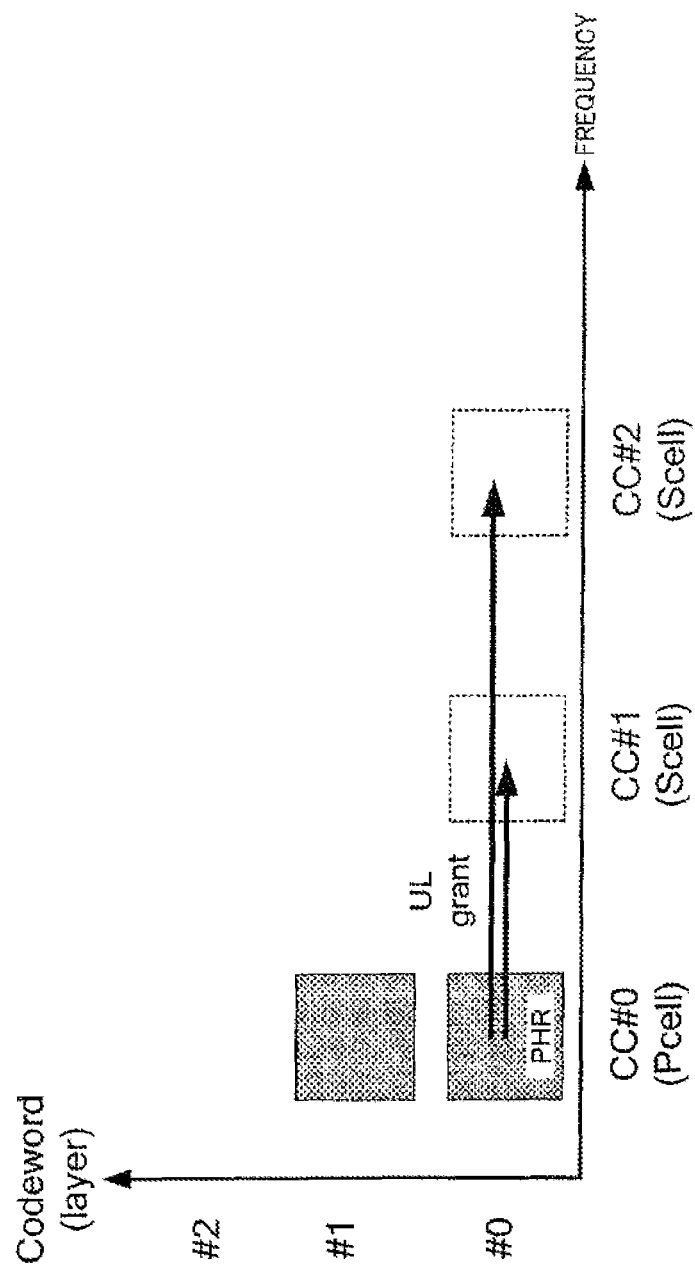
FIG. 11 is a diagram illustrating operation of a PHR calculation section of a terminal according to Embodiment 2 of the present invention.

Operation of the PHR calculation section of the terminal according to Embodiment 2 of the present invention will be described using FIG. 11. FIG. 11 assumes a case where carrier aggregation is configured of three CCs, and CC#0 represents a primary cell (Pcell or PCC (Primary component carrier)), CC#1 and CC#2 represent secondary cells (Scell or SCC (Secondary component carrier)). Furthermore, PUSCHs of CCs enclosed by a dotted line represent PUSCHs with no UL grant (no transmission) and shaded areas represent PUSCHs with a UL grant (with transmission). Furthermore, codeword numbers #0 and #1 represent a case where transmission is performed using two space resources (layers). Furthermore, CC#0 and codeword number=#0 are used to report a PHR.

As is clear from FIG. 11, a UL grant of a codeword of a CC that transmits a PHR is used to calculate a PHR of a PUSCH of a CC with no UL grant. For codeword number=#0, a UL grant of CC#0 is used to calculate a PHR with no UL grant of a CC#1. Furthermore, for codeword number=#0, a UL grant of CC#0 is used to calculate a PHR of CC#2 with no UL grant.

At timings of reporting a PHR, for a PUSCH of a codeword of a CC with a UL grant, a per CC PHR is calculated based on the information thereof. For example, the PHR of CC#0 and codeword number #0 is calculated using a UL grant of CC#0 and codeword number #0.

Thus, in the present embodiment, a PHR of a PUSCH in a codeword of a CC with no UL grant is calculated by sharing the same UL grant between different CCs (frequencies), for example, using a UL grant of a PUSCH used to transmit a PHR of another CC with the same codeword number as the above codeword. This is because since the fact that a PHR of a PUSCH with a UL grant has been successfully calculated means nothing but that a UL grant of the PUSCH has been received without fail, and sharing such a UL grant prevents a recognition mismatch, that is, the terminal and the base station recognize different UL grants.

Figure 12:
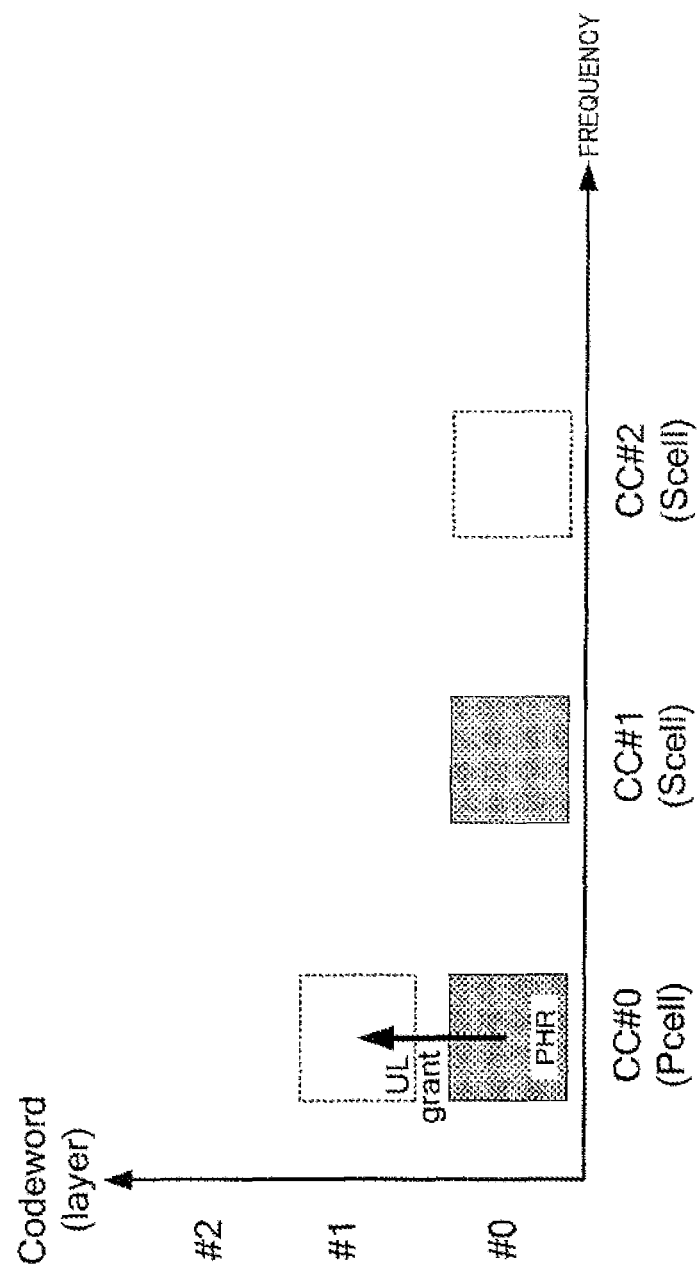
FIG. 12 is a diagram illustrating operation of the PHR calculation section of the terminal according to Embodiment 2 of the present invention.

Furthermore, even when MIMO transmission is performed using a CC that transmits a PHR, if the terminal can correctly receive even one UL grant of a plurality of CCs, that is, if the terminal does not fail to receive all UL grants of the plurality of CCs, the base station can acquire a PHR from the terminal without any delay for a PUSCH with no UL grant in the same way as a PUSCH with a UL grant. Furthermore, the base station need not store past UL grants. Furthermore, as described above, by using parameter information used to calculate a transmission power headroom of an uplink channel that transmits a PHR to calculate transmission power or a transmission power headroom of another uplink channel that does not transmit any uplink allocation signal for each component carrier, it is possible to increase the probability of being able to accurately report, to the base station, PHRs of a plurality of CCs including a PHR calculated using a reference format A case has been described in FIG. 11 where a UL grant of a PUSCH used to transmit a PHR is shared among different CCs (frequencies), but as shown in FIG. 12, a UL grant of a PUSCH used to transmit a PHR may also be shared between different space resources (codewords, layers). FIG. 12 shows a case where a UL grant of CC#0 and codeword number=#0 is used as a reference format to calculate transmission power of CC#0 and codeword number=#1. A per CC or per antenna PHR may be calculated from transmission power for every two codewords (layers, antennas).

Figure 13:
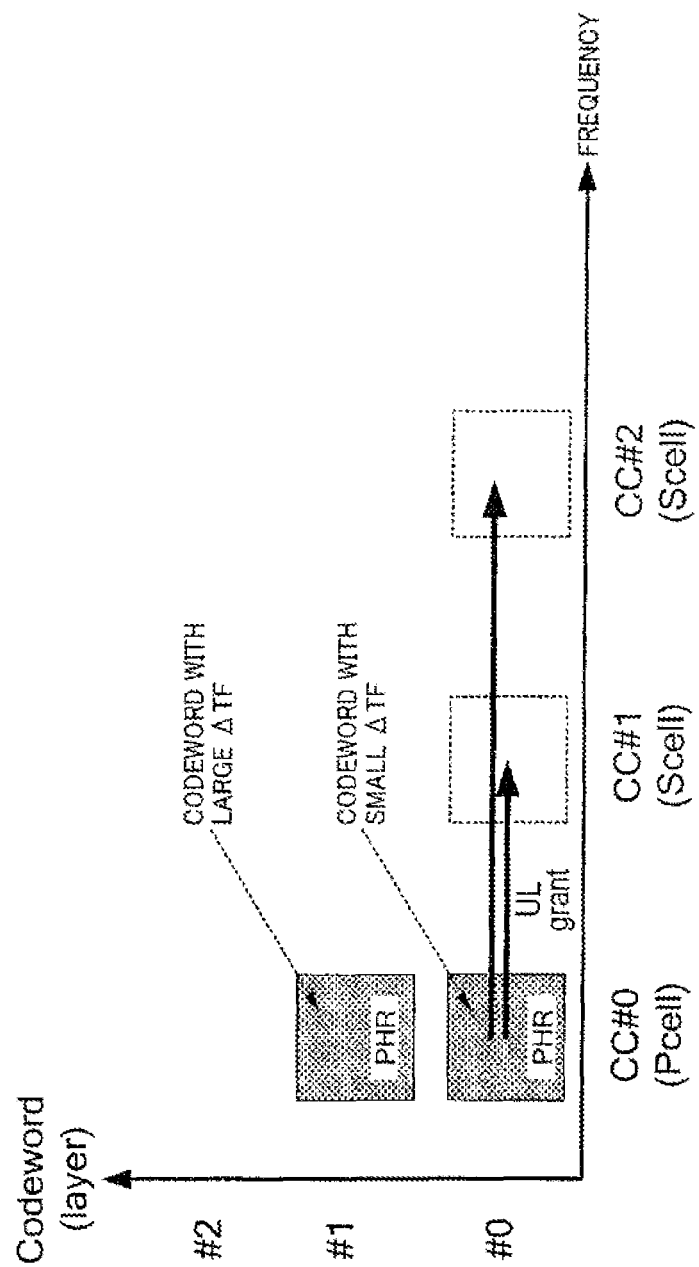
FIG. 13 is a diagram illustrating a situation in which one UL grant is selected from among a plurality of UL grants.

Here, a case will be described where a PHR is transmitted in MIMO over two or more codewords. In such a case, as shown in FIG. 13, a UL grant of a codeword whose ΔTF value is minimum (MCS is low) among a plurality of items of UL grant allocation information is used as a reference format.

For a PHR according to 3GPP LTE Rel.8, a range of −23 to 40 [dB] is expressed in 64 levels (6 bits) at a resolution of 1 [dB]. Furthermore, in the case of a PHR value other than that described above, the value is approximated to a PHR of an integer nearest to the above range. When MIMO is used, transmission power increases, and in addition, by using a UL grant of a PUSCH of another CC as a reference format, there may also be a case where the above upper limit value may be exceeded. Therefore, by using a UL grant of a codeword whose ΔTF value is a minimum (MCS is low) among a plurality of items of UL grant allocation information, it is possible to prevent a per CC PHR from exceeding an upper limit value and reduce the probability of reporting an inaccurate PHR.

When a codeword is multiplexed or not multiplexed with UCI information such as ACK/NACK, SR, CQI, CSI, PMI or RI, a codeword (TB, layer) that references a UL grant may be selected based on a parameter that determines the ΔTF value as shown below.

When UCI is not multiplexed, a UL grant of a codeword whose payload size or payload size/number of resources is small may be used as a reference format. Furthermore, a UL grant of a codeword whose code block size is small or whose MCS is low may be used as a reference format.

Selecting a codeword whose payload size or payload size/number of resources is small allows a codeword whose ΔTF is small to be selected, and it is thereby possible to prevent a per CC PHR from exceeding an upper limit value and reduce the probability of reporting an inaccurate PHR.

When UCI is multiplexed, a UL grant of a codeword whose payload size or payload size/number of resources is small may be used as a reference format. Furthermore, a UL grant of a codeword with a small number of bits of UCI (CQI, PMI, ACK/NACK, RI) multiplexed with the codeword may be used as a reference format.

Thus, by selecting a codeword whose payload size or payload size/number of resources is small, a codeword with small ΔTF can be selected, and it is thereby possible to prevent a per CC PHR from exceeding an upper limit value and reduce the probability of reporting an inaccurate PHR.

When a PHR is transmitted in MIMO over two or more codewords, a codeword that references a reference format is selected based on ΔTF, but in addition, a codeword whose bandwidth ($M_{PUSCH}$) is a minimum or a codeword whose 10 log($M_{PUSCH}$)+ΔTF is minimum may be selected as the reference destination of the reference format.

Thus, according to Embodiment 2, a PHR of a PUSCH in a codeword of a CC with no UL grant is calculated using a UL grant used to calculate a PHR for a space resource different from the PUSCH, and it is thereby possible to prevent a recognition mismatch, that is, the terminal and base station recognize different UL grants, so that the base station can perform scheduling, link adaptation or resource allocation based on a PHR in which there is no recognition mismatch between the base station and the terminal. Furthermore, the base station need not store past UL grants. Furthermore, as described above, by using parameter information used to calculate a transmission power headroom of an uplink channel that transmits a PHR to calculate transmission power or a transmission power headroom of another uplink channel that does not transmit any uplink allocation signal for each component carrier, it is possible to increase the probability of being able to accurately notify the base station of PHRs of a plurality of CCs including the PHR calculated using a reference format.

In the above embodiment, when an element value of a MIMO precoding vector is added to a transmission power value, an element value having a minimum value among a plurality of codewords (layers) (the square of the absolute value (power value)) may be shared among a plurality of antennas to calculate a PHR. This makes it possible to prevent the PHR from exceeding its upper limit value and reduce the probability of reporting an inaccurate PHR.

Figure 14:
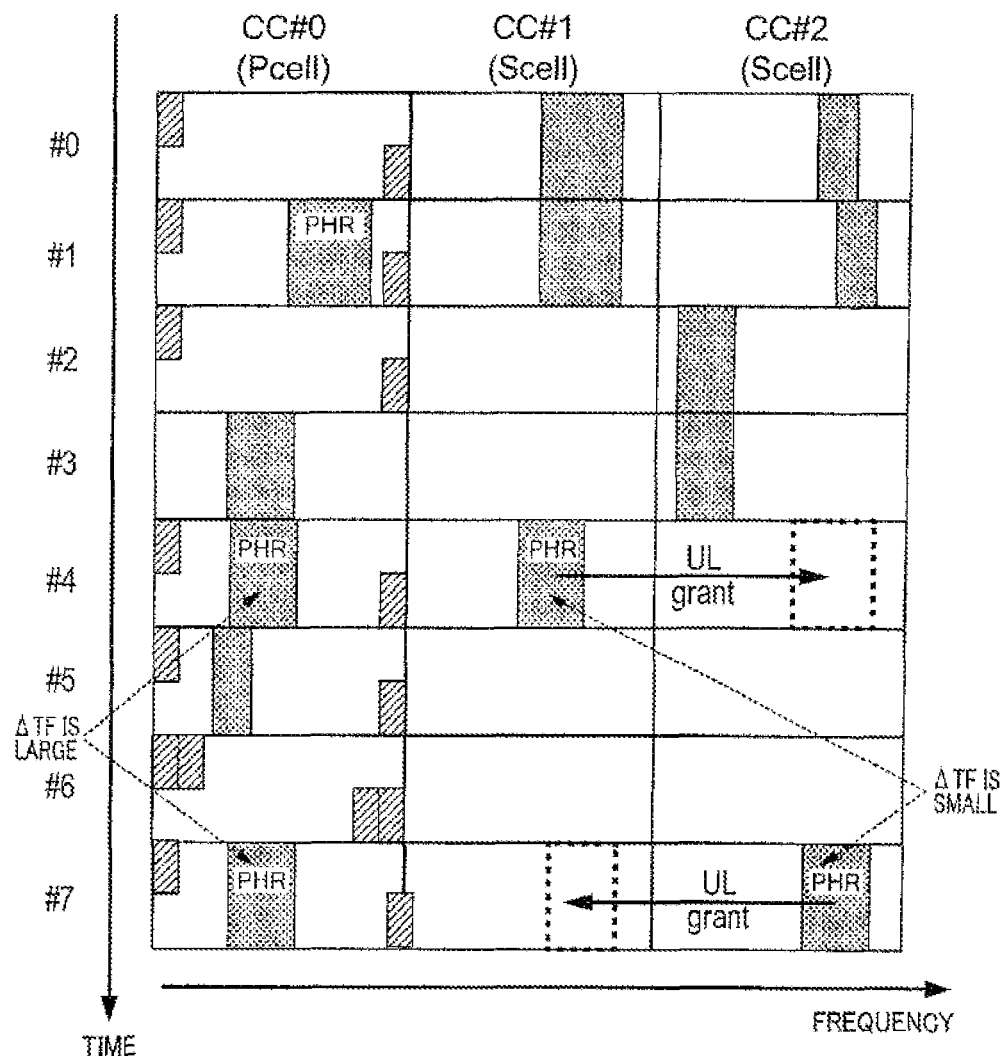
FIG. 14 is a diagram illustrating a situation in which one UL grant is selected from among a plurality of UL grants.

Furthermore, in a concept similar to that when PHRs are transmitted in MIMO over two or more codewords, if the term "codeword (layer)" is read as a "CC (PUSCH, TB, frequency)" or the like, the concept is also applicable to among CCs (frequency domain). FIG. 14 shows a case where a PHR is reported using CC#0 (#0) and CC#1 (#2) in subframe number=#4 (#7), and ΔTF of a PUSCH of CC#1 (#2) is small and ΔTF of a PUSCH of CC#0 (#0) is large in subframe number=#4 (#7). Therefore, in subframe number=#4 (#7), a UL grant of CC#1 (#2) is used to calculate a PHR of CC#2 (#1).

The embodiments have been described so far.

In Embodiment 1, when PHRs are transmitted over a plurality of CCs, a UL grant of a PUSCH of a CC whose ΔTF, $M_{PUSCH}$ or 10 log($M_{PUSCH}$)+ΔTF is a minimum may be selected as a reference format as in the case of Embodiment 2. In this way, effects similar to those in Embodiment 2 can be obtained.

Furthermore, when a PHR of the entire terminal is reported in addition to the per CC PHR and a reference format is used for the calculation, the PHR of the entire terminal may be calculated according to one of the methods described in Embodiment 1 and Embodiment 2.

In the above embodiments, although a subframe has been taken as an example of the unit of PHR report timing, the present invention is not limited to this, but a unit such as TTI, slot, symbol or the like may also be used.

Furthermore, in the above embodiments, at least one of bandwidth and ΔTF of a UL grant is referenced to calculate a PHR, and accumulated value (f(i)) of a TPC command and pathloss estimate value (PL) need not be shared. That is, information of a CC (PUSCH) of a UL grant may be used without any change for the accumulated value of TPC command and pathloss estimate value. Thus, by making a comparison for each CC between the past PHR report information or reported PHR and pathloss estimate value calculated from the (reference) UL grant information at that point in time and the current information (value), even when there is no UL grant, the base station can more easily detect the amount of pathloss change in the corresponding CC and error information of the TPC command, and can use the information for scheduling and link adaptation.

In the foregoing embodiments, the present invention is configured with hardware by way of example, but the invention may also be provided by software in cooperation with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although an antenna has been described in the aforementioned embodiments, the present invention may be similarly applied to an antenna port.

The antenna port refers to a logical antenna including a single or a plurality of physical antenna(s). That is, the antenna port is not limited to a single physical antenna, but may refer to an array antenna including a plurality of antennas.

For example, in 3 GPP LTE, how many physical antennas are included in the antenna port is not specified, but the minimum unit allowing the base station to transmit different reference signals is specified.

In addition, the antenna port may be specified as a minimum unit for multiplying a weight of the pre-coding vector.

The disclosure of Japanese Patent Application No. 2010-178671, filed on Aug. 9, 2010, including the specification, drawings and abstract is incorporated herein by reference in its entirety.

INDUSTRIAL APPLICABILITY

The radio communication terminal apparatus and the radio communication method according to the present invention are applicable to a mobile communication system or the like.

REFERENCE SIGNS LIST 101, 201 antenna
102, 202 radio reception processing section
103 OFDM demodulation section
104, 205-1 to 205-N demodulation section
105, 206-1 to 206-N channel decoding section
106 extraction section
107, 208 PHR control section
108 TB (CC) selection section
109 PHR calculation section
110-1 to 110-N multiplexing section
111-1 to 111-N, 213-1, 213-2 channel coding section
112-1 to 112-N, 214-1, 214-2 modulation section
113-1 to 113-N SC-FDMA modulation section
114 combining section
115, 216 radio transmission processing section
203, 207-1 to 207-N demultiplexing section
204-1 to 204-N SC-FDMA demodulation section
209 TB (CC) decision section
210 PHR extraction section
211 scheduling section
212 control information generation section
215 OFDM modulation section

The invention claimed is:
1. An integrated circuit comprising:
at least one input port, which, in operation, receives an input; and
a circuit coupled to the at least one input port, which, in operation:
receives control information that is transmitted using a Physical Downlink Control Channel (PDCCH) or a higher layer;
calculates a power headroom of an uplink channel based on parameter information including the received control information;
calculates a transmission power of the uplink channel using the parameter information that was used to calculate the power headroom of the uplink channel, wherein the power headroom of the uplink channel corresponds to the power headroom which is calculated when an accumulated value of a Transmit Power Control (TPC) command is zero, wherein a value of the TPC command is used to control the transmission power, wherein the power headroom which is calculated when the accumulated value of the TPC command is zero is obtained by subtracting, from a maximum transmission power (Pcmax), a value calculated using at least part of the parameter information except a transmission power accumulated value that is calculated using the TPC command transmitted on the PDCCH; and
controls an uplink transmission power using the calculated power headroom of the uplink channel.
2. The integrated circuit according to claim 1, further comprising:
at least one output coupled to the circuit, which, in operation, outputs a signal.

3. The integrated circuit according to claim 1, wherein the calculation of the power headroom and the calculation of the transmission power are performed for a single subframe.

4. The integrated circuit according to claim 1, wherein:
the control information includes at least one of an allocation bandwidth of the uplink channel, an offset value ΔTF(j) that is related to a Modulation and Coding Scheme (MCS), the Transmit Power Control (TPC) command, and, parameters P0_PUSCH (j) and α(j) which are information transmitted from a base station using the higher layer; and
the parameter information further includes a pathloss estimate value (PL), the maximum transmission power (Pcmax), and a parameter that is calculated using at least a portion of the control information.

5. The integrated circuit according to claim 1, wherein the power headroom of the uplink channel corresponds to a power headroom which is calculated when the uplink channel is not transmitted.

6. An integrated circuit comprising:
at least one input port which, in operation, receives an input; and
a circuit coupled to the at least one input port, which, in operation:
calculates a transmission power of an uplink channel using parameter information that was used to calculate a power headroom of the uplink channel;
calculates the power headroom using the parameter information including control information that was transmitted on a Physical Downlink Control Channel (PDCCH) or a higher layer, wherein the power headroom corresponds to the power headroom which is calculated when an accumulated value of a Transmit Power Control (TPC) command is zero, wherein a value of the TPC command is used to control the transmission power, wherein the calculation of the power headroom and the calculation of the transmission power are performed for a single subframe, wherein the power headroom which is calculated when the accumulated value of the TPC command is zero is obtained by subtracting, from a maximum transmission power (Pcmax), a value calculated using at least part of the parameter information except a transmission power accumulated value that is calculated using the TPC command transmitted on the PDCCH; and
controls an uplink transmission power using the calculated power headroom of the uplink channel.

7. The integrated circuit according to claim 6, further comprising:
at least one output coupled to the circuit, which, in operation, outputs a signal.

8. The integrated circuit according to claim 6, wherein
the control information includes at least one of an allocation bandwidth of the uplink channel, an offset value ΔTF(j) that is related to a Modulation and Coding Scheme (MCS), the Transmit Power Control (TPC) command, and, parameters P0_PUSCH (j) and α(j) which are information transmitted from a base station using the higher layer; and
the parameter information further includes a pathloss estimate value (PL), the maximum transmission power (Pcmax), and a parameter that is calculated using at least a portion of the control information.

9. The integrated circuit according to claim 6, wherein the power headroom of the uplink channel corresponds to a power headroom which is calculated when the uplink channel is not transmitted.

10. A radio communication terminal apparatus comprising:
at least one input port, which, in operation, receives an input; and
a circuit coupled to the at least one input port, which, in operation:
receives control information that is transmitted using a Physical Downlink Control Channel (PDCCH) or a higher layer;
calculates a power headroom of an uplink channel based on parameter information including the received control information and calculates a transmission power of the uplink channel using the parameter information that was used to calculate the power headroom of the uplink channel, wherein the power headroom of the uplink channel corresponds to the power headroom which is calculated when an accumulated value of a Transmit Power Control (TPC) command is zero, wherein a value of the TPC command is used to control the transmission power, wherein the power headroom which is calculated when the accumulated value of the TPC command is zero is obtained by subtracting, from a maximum transmission power (Pcmax), a value calculated using at least part of the parameter information except a transmission power accumulated value that is calculated using the TPC command transmitted on the PDCCH; and
controls an uplink transmission power using the calculated power headroom of the uplink channel.

\* \* \* \* \*